(12) United States Patent
Yamane (10) Patent No.: US 7,050,714 B2
(45) Date of Patent: May 23, 2006

(54) CAMERA WITH MOVABLE LENS BARREL

(75) Inventor: Kenji Yamane, Saitama (JP)

(73) Assignee: Fuji Photo Optical.Co., Ltd., Saitama (JP)

( * ) Notice: Subject to any disclaimer, the term of this patent is extended or adjusted under 35 U.S.C. 154(b) by 147 days.

(21) Appl. No.: 10/806,445

(22) Filed: Mar. 23, 2004

(65) Prior Publication Data

US 2004/0184797 A1    Sep. 23, 2004

(30) Foreign Application Priority Data

Mar. 24, 2003    (JP) .............................. 2003-081242

(51) Int. Cl.
*G03B 15/03* (2006.01)
*G03B 17/04* (2006.01)

(52) U.S. Cl. ...................... 396/177; 396/349; 396/448
(58) Field of Classification Search ........ 396/176–178, 396/349, 448
See application file for complete search history.

(56) References Cited

U.S. PATENT DOCUMENTS

| 5,950,028 | A | 9/1999 | Ito | 396/349 |
| 6,072,954 | A * | 6/2000 | Onda | 396/61 |
| 6,314,244 | B1 | 11/2001 | Manabe | 396/175 |
| 6,374,051 | B1 | 4/2002 | Yamane | 396/177 |
| 2004/0190891 | A1* | 9/2004 | Yamane | 396/349 |
| 2004/0190892 | A1* | 9/2004 | Yamane | 396/448 |

FOREIGN PATENT DOCUMENTS

| JP | 1-255839 | 10/1989 |
| JP | 2001166362 | 6/2001 |

* cited by examiner

*Primary Examiner*—W. B. Perkey
(74) *Attorney, Agent, or Firm*—Young & Thompson (57) ABSTRACT

A camera includes a movable lens barrel, a flip-up flash emitting unit, a biasing spring to retract the flash emitting unit, and a slidable cover for a front of the movable lens barrel. A transmission gear transmits motion from a motor toward the movable lens barrel. A flash shifting transmission ring moves the flash emitting unit between a contained position and a flashing position in response to the motion transmitted by the transmission gear. A connection changer is set in a first set position when the slidable cover is in a closed position, and set in a second set position when the slidable cover is in an open position, for unlinking the transmission ring from the transmission gear when in the first set position, and for linking the transmission ring with the transmission gear when in the second set position.

12 Claims, 11 Drawing Sheets

CAMERA WITH MOVABLE LENS BARREL

BACKGROUND OF THE INVENTION

1. Field of the Invention

The present invention relates to a camera with a movable lens barrel. More particularly, the present invention relates to a camera which has a movable lens barrel and a flash device, and in which a flash emitting unit of the flash device is kept movable in response to movement of the movable lens barrel for unfolding and collapsing.

2. Description Related to the Prior Art

There is a flash built-in type of camera useful in taking an exposure at night or for a rear light scene. For example, U.S. Pat. No. 6,314,244 (corresponding to JP-A 2000-330168) discloses a camera with a flip-up flash device in which a flip-up flash emitting unit is movable for the purpose of protection of the flash emitting unit or preventing a red-eye phenomenon. The flash emitting unit is movable relative to a camera body between a contained position and a flashing position, and when the camera is not used, is moved to the contained position, and when the camera is used, is moved to the flashing position where the flash emitting unit protrudes from the camera body.

To exert force for moving the flash emitting unit, a motor or actuator for moving a movable lens barrel back and forth is used. When a power source for the camera is turned on for moving the movable lens barrel in the forward direction from a collapsed position, the flash emitting unit is also shifted from the contained position to the flashing position. When the power source for the camera is turned off, the movable lens barrel is moved back to the collapsed position. The flash emitting unit also shifts from the flashing position to the contained position.

If a considerably large clearance occurs between the flash emitting unit and an opening for containing the flash emitting unit set in the contained position, quality of the camera is not very high in view of good appearance of the camera. Also, excessive play of the flash emitting unit in the contained position results in low quality. Thus, it has been suggested that a stroke of a mechanism used for moving the flash emitting unit is set larger than a stroke of the flash emitting unit moving itself to the contained position. A difference between those strokes is absorbed by a biasing spring incorporated in the camera.

It is inevitable that long time elapses while the camera is carried or preserved by a user or dealer without being used. Force exerted by a spring for biasing the flash emitting unit toward the contained position is applied to plural gears which transmit motion of the motor to the movable lens barrel. Such gears for use in the camera are formed from plastic materia in view of reducing the size, weight and cost. However, it is likely the deformation of creep may occur in teeth of the plastic gears due to concentration of stress for a long time.

SUMMARY OF THE INVENTION

In view of the foregoing problems, an object of the present invention is to provide a camera which has a movable lens barrel and a flash device, and in which degradation of a mechanism including gears is prevented even with long time, for keeping good quality of the movable construction in which a flash device is associated with a movable lens barrel.

In order to achieve the above and other objects and advantages of this invention, a camera includes a movable lens barrel movable between a collapsed position and at least one photographing position, contained in a camera body when in the collapsed position, set more forward when in the at least one photographing position than when in the collapsed position, for holding a taking lens. A flash emitting unit is movable between a contained position and a flashing position, contained in the camera body when in the contained position, and disposed to protrude from the camera body when in the flashing position, for emitting flash light to a photographic field. A first biasing element biases the flash emitting unit toward the contained position. A slidable cover is movable between a closed position and an open position, for covering a front of the movable lens barrel when in the closed position, and for uncovering the front of the movable lens barrel when in the open position. A driving source is adapted to move the movable lens barrel and the flash emitting unit. A transmission gear mechanism transmits motion from the driving source to the movable lens barrel. A flash shifter moves the flash emitting unit between the contained position and the flashing position in response to the motion transmitted by the transmission gear mechanism. A connection changer is set in a first set position when the slidable cover is in the closed position, and set in a second set position when the slidable cover is in the open position, for unlinking the flash shifter from the transmission gear mechanism when in the first set position, and for linking the flash shifter with the transmission gear mechanism when in the second set position.

The connection changer shifts the flash shifter when set in the first set position, and unlinks the flash shifter from the transmission gear mechanism, to keep the transmission gear mechanism free from force of the first biasing element.

The flash shifter includes a transmission ring for moving the flash emitting unit to the flashing position in response to the motion generated in a predetermined direction transmitted by the transmission gear mechanism, the transmission ring being disposed about the movable lens barrel. The connection changer rotates the transmission ring when set in the first position, and unlinks the transmission ring from the transmission gear mechanism.

Furthermore, a power switch is changed over in response to shifting of the slidable cover, for switching electric power for being supplied to the driving source.

The connection changer disables the slidable cover from sliding to the closed position before completion of movement of the movable lens barrel to the collapsed position.

The transmission gear mechanism includes a transmission gear for moving the movable lens barrel in response to the motion of the driving source. A ring-shaped gear is rotated in response to rotation of the transmission gear, for rotating the transmission ring, the ring-shaped gear being disposed about the movable lens barrel.

The connection changer includes a cover stopper is movable between a stopping position and a releasing position, for retaining the slidable cover in the open position when in the stopping position, and for allowing the slidable cover to move from the open position toward the closed position when in the releasing position. A locking mechanism shifts in response to shifting of the movable lens barrel, retains the cover stopping in the stopping position when the movable lens barrel is in the at least one photographing position, and allows the cover stopper to move from the stopping position to the releasing position when the movable lens barrel is in the collapsed position.

The flash shifter further includes a first shift lever rotated by the transmission ring. A second shift lever shifts the flash emitting unit. A flash biasing element biases the flash emitting unit toward the flashing position. The first biasing element is extensible, is secured between retaining portions of the first and second shift levers, for shifting the second shift lever away from the flash emitting unit in response to the motion generated in the predetermined direction by the driving source, to cause the flash biasing element to set the flash emitting unit in the flashing position.

The first biasing element is stretched by the first shift lever in response to the motion generated in a direction reverse to the predetermined direction by the driving source, for rotating the second shift lever, to set the flash emitting unit in the contained position.

The first shift lever has first and second lever ends, and the first lever end is connected with the transmission ring. The second shift lever has first and second engaging ends, and the first engaging end sets the flash emitting unit in the contained position by engagement therewith. The second engaging end is pressed by the second lever end, for rendering the flash emitting unit free from the first engaging end, to set the flash emitting unit in the flashing position.

The locking mechanism includes a locking projection, disposed to project from the transmission ring, for being pressed by the cover stopper.

The locking mechanism, in response to setting of the slidable cover in the open position, becomes engaged tightly with the cover stopper, to lock the cover stopper in the stopping position, and in response to setting of the slidable cover in the closed position, becomes disengaged from the cover stopper in the stopping position, to allow the cover stopper to move back to the releasing position.

Furthermore, a stopper biasing element biases the cover stopper toward the stopping position, to set the cover stopper therein. A pressing portion is provided in the slidable cover, for pressing the cover stopper toward the releasing position against the stopper biasing element when the slidable cover is in the closed position, to set the cover stopper therein.

The transmission gear mechanism moves the movable lens barrel to the at least one photographing position in response to the motion generated in the predetermined direction by the driving source.

Furthermore, a locking recess is formed in the slidable cover, for retaining the cover stopper in the stopping position when the slidable cover is in the open position.

The cover stopper is rotatable about an axis. The pressing portion of the slidable cover, when set in the open position, is away from a front of the cover stopper, and allows the stopper biasing element to rotate the cover stopper from the releasing position, the cover stopper being retained in the stopping position by the locking recess. The slidable cover, when set in the closed position, presses and rotates the cover stopper from the stopping position with the pressing portion, the cover stopper being in the releasing position and pressing the locking mechanism, for locking the locking mechanism in an initial state.

The releasing position of the cover stopper is defined behind the stopping position thereof, the pressing portion is opposed to a stopper front end of the cover stopper when in the closed position, and the locking recess receives the stopper front end when in the open position.

Furthermore, an auxiliary biasing element transmits the motion from the transmission gear mechanism to the flash shifter by biasing the flash shifter, to retain the cover stopper in the stopping position.

The at least one photographing position comprises a wide-angle position, and a telephoto position defined in front of the wide-angle position. With the transmission gear mechanism, there is a ring-shaped gear, concentric with the transmission ring, for being rotated by the driving source. The transmission ring is engaged with and rotated by the ring-shaped gear while the movable lens barrel moves between the collapsed position and the wide-angle position, for moving the flash emitting unit.

Furthermore, a stationary barrel has a front edge portion protruding from a front of the camera body, for supporting the movable lens barrel movably in forward and backward directions. The transmission ring is secured to an outside of the stationary barrel in a rotatable manner.

The locking projection moves along a front panel surface of the camera body.

Furthermore, a first inclined surface of the locking mechanism is opposed to the cover stopper, and inclined relative to a moving direction thereof. A second inclined surface of the cover stopper is inclined relative to the moving direction, for pressing the first inclined surface with the cover stopper in the releasing position when the slidable cover is in the closed position, to lock the locking mechanism in the initial state.

Furthermore, a rear locking face of the cover stopper is opposed to the locking mechanism. A front locking face of the locking mechanism presses the rear locking face when the slidable cover is in the open position, to lock the cover stopper in the stopping position.

Furthermore, a front cover is secured to a front of the camera body, for supporting a rear of the slidable cover movably, the front cover being disposed in front of the cover stopper. An opening is formed in the front cover, for receiving entry of a stopper front end of the cover stopper.

In a preferred embodiment, the transmission mechanism includes at least one pressing projection formed with the ring-shaped gear. A second biasing mechanism biases the transmission ring rotationally in the first direction. At least one engaging projection is formed with the transmission ring and adapted to contact with the pressing projection, wherein when the ring-shaped gear rotates in the first direction, the second biasing mechanism causes the transmission ring to rotate in the first direction, and the engaging projection moves simultaneously with the pressing projection, and when the ring-shaped gear rotates in the second direction, the pressing projection causes the transmission ring to rotate in the second direction by pressing the engaging projection.

The slidable cover is moved back to the closed position after the motor is turned off, and responsively the connection changer causes the transmission ring further in the second direction, to set away the engaging projection from the pressing projection.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1A:
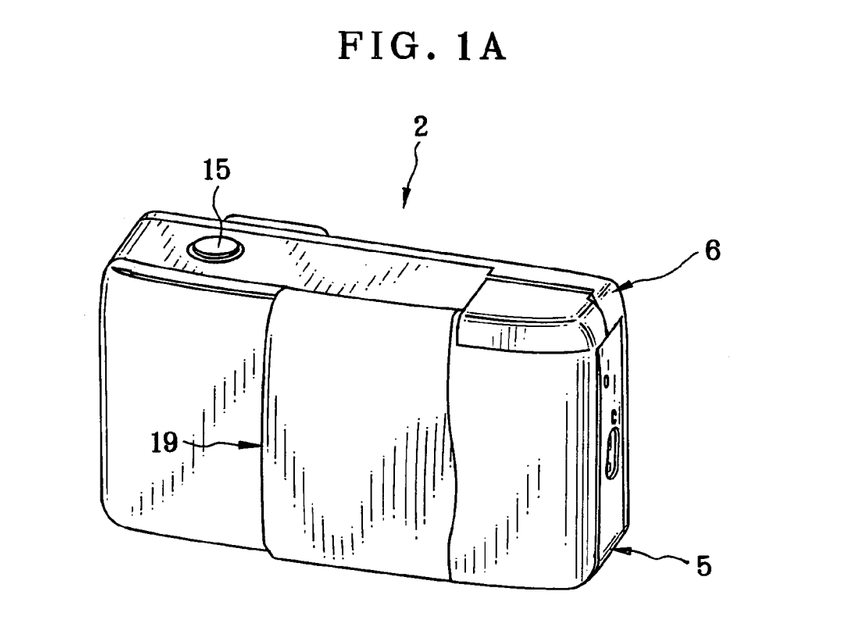
FIG. 1A is a perspective illustrating a flash built-in camera of which a slidable cover is closed.
Figure 1B:
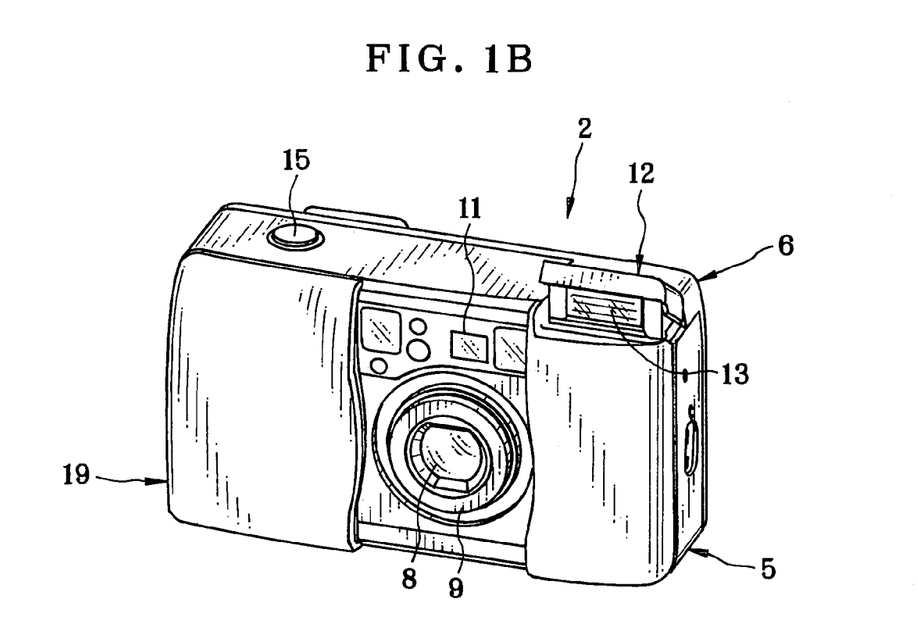
FIG. 1B is a perspective illustrating a state of the camera with the slidable cover in an open position.

In FIGS. 1A and 1B, a flash built-in camera 2 of the invention is illustrated. The camera 2 is a compact type for use with a 135 photo film cassette, and includes a camera body 4, a front cover 5 and a rear cover 6. The camera body 4 includes various elements for the purpose of taking exposures. See FIG. 2. The front and rear covers 5 and 6 are fitted on the camera body 4 to cover the same. Most of the elements or parts in the camera 2 are plastic parts. However, partial elements are metallic as required for mechanical strength, electrical conductivity or the like.

A movable lens barrel 9 is incorporated in the center of the camera 2, and includes a taking lens 8 or zoom optical system, a shutter and an aperture stop mechanism. The movable lens barrel 9 is movable between a collapsed position, a wide-angle end position and a telephoto end position. The movable lens barrel 9 is contained in the camera 2 when in the collapsed position. The movable lens barrel 9, when the power source for the camera 2 is turned on, is moved in a forward direction to come to the wide-angle end position. Also, the movable lens barrel 9 is further moved in the forward direction to come to the telephoto end position defined in front of the wide-angle end position.

A viewfinder objective window 11 is disposed higher than the movable lens barrel 9. Various windows are disposed near to the viewfinder objective window 11, including a rangefinding window for projecting light, a rangefinding window for receiving the light, a photometric window, and a self-timer window for emitting signaling light. A flip-up flash device 12 includes a flip-up flash emitting unit, which is incorporated in the camera 2 at one upper corner. There is a flashing surface 13 of the flash emitting unit directed toward the outside. The flash emitting unit is rotationally shiftable between a contained position and a flashing position, and when in the contained position, keeps the flashing surface 13 contained in the camera 2, and when in the flashing position, sets the flashing surface 13 directed to a field or object to be photographed.

A shutter release button 15 is disposed in an upper panel of the camera 2. The rear (not shown) of the camera 2 is provided with a viewfinder eyepiece window, and a zoom button for moving the movable lens barrel 9 between the wide-angle and telephoto end positions back or forth, and for moving the movable lens barrel 9 backwards to the collapsed position.

A slidable cover 19 is secured to the front of the front cover 5, and slidable to the right and left between a closed position and an open position, and when in the closed position, covers the front of the movable lens barrel 9, and when in the open position, uncovers the front of the movable lens barrel 9. The rear cover 6 is also provided with a rear lid and a battery lid. The rear lid openably closes a cassette loading chamber, a roll chamber, and an exposure aperture in between. The battery lid openably closes a battery chamber.

Figure 2:
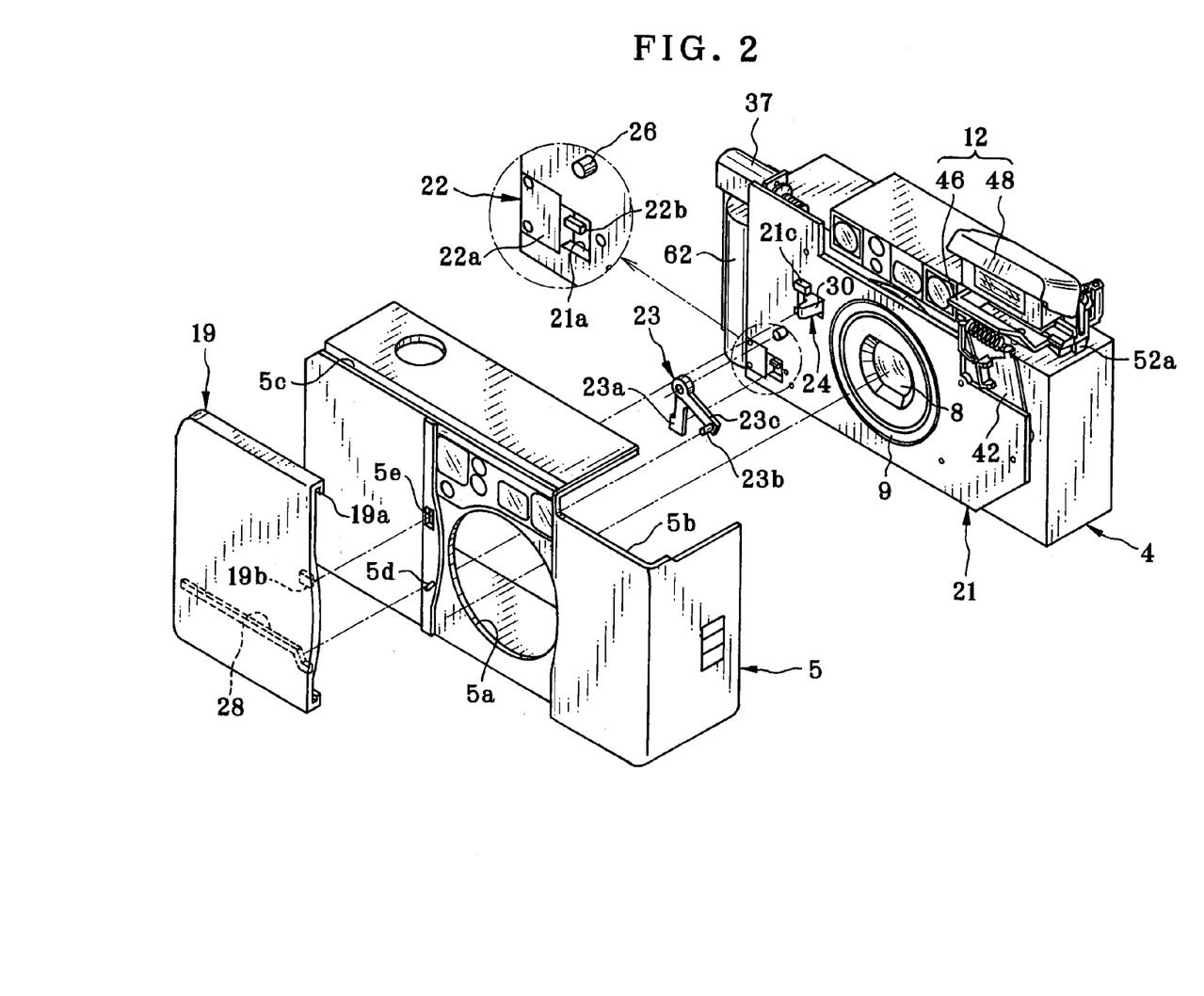
FIG. 2 is an exploded perspective illustrating a camera body, a front cover and the slidable cover.

In FIG. 2, a state of disassembly of the camera body 4, the front cover 5 and the slidable cover 19 is disposed in a perspective. A circular opening 5a is formed in the front cover 5 for insertion of the movable lens barrel 9. An upper cutout 5b is formed in the front cover 5 for receiving positioning of the flip-up flash device 12. Also, a rail groove 5c is formed in each of upper and lower edge portions of the front cover 5, and extends horizontally. A ridge 19a protrudes from each of upper and lower edges of the slidable cover 19, and is received in the rail groove 5c.

An inner cover panel 21 is secured to the front of the camera body 4, and keeps various elements set on the camera body 4. On the inner cover panel 21 are mounted a power switch 22, a switch lever 23, and a connection changer 24 as cover stopper. The power switch 22 turns on and off power for the camera 2. The switch lever 23 transmits motion of the slidable cover 19 to the power switch 22 for switching operation. The connection changer 24 regulates a range of sliding of the slidable cover 19.

The power switch 22 is a depressible type, and includes a switch body 22a and a pushbutton element 22b, which is movable into and out of an inside space of the switch body 22a, to turn on and off the power. A support pin 26 is disposed close to the power switch 22, and supports the switch lever 23 in a rotatable manner. The switch lever 23 includes a switching arm 23a and a linking arm 23c. The switching arm 23a is inserted in an opening 21a in the inner cover panel 21, to depress the pushbutton element 22b, or to release the pushbutton element 22b from the depression. The linking arm 23c has a linking pin 23b. A slot 5d is formed in the front portion of the front cover 5. A linking groove 28 is formed in a rear face of the slidable cover 19 to extend horizontally. The linking pin 23b is inserted in the slot 5d and in the linking groove 28. Note that the linking groove 28 has a shape including an end bent portion directed downwards near a lateral edge of the slidable cover 19.

The linking pin 23b of the switch lever 23 is located in a range of the horizontal portion of the linking groove 28 when the slidable cover 19 is in the closed position, and between the closed position and a point slightly short of the open position. While the linking pin 23b is in the horizontal range of the linking groove 28, the power for the camera 2 is kept turned off, because the switching arm 23a does not depress the pushbutton element 22b of the power switch 22. When the slidable cover 19 is slid to the open position, the linking pin 23b moves along the end bent portion of the linking groove 28, to cause the switch lever 23 to rotate in the clockwise direction. During this rotation, the switching arm 23a depresses the pushbutton element 22b of the power switch 22, to turn on the power source for the camera 2.

Figure 3:
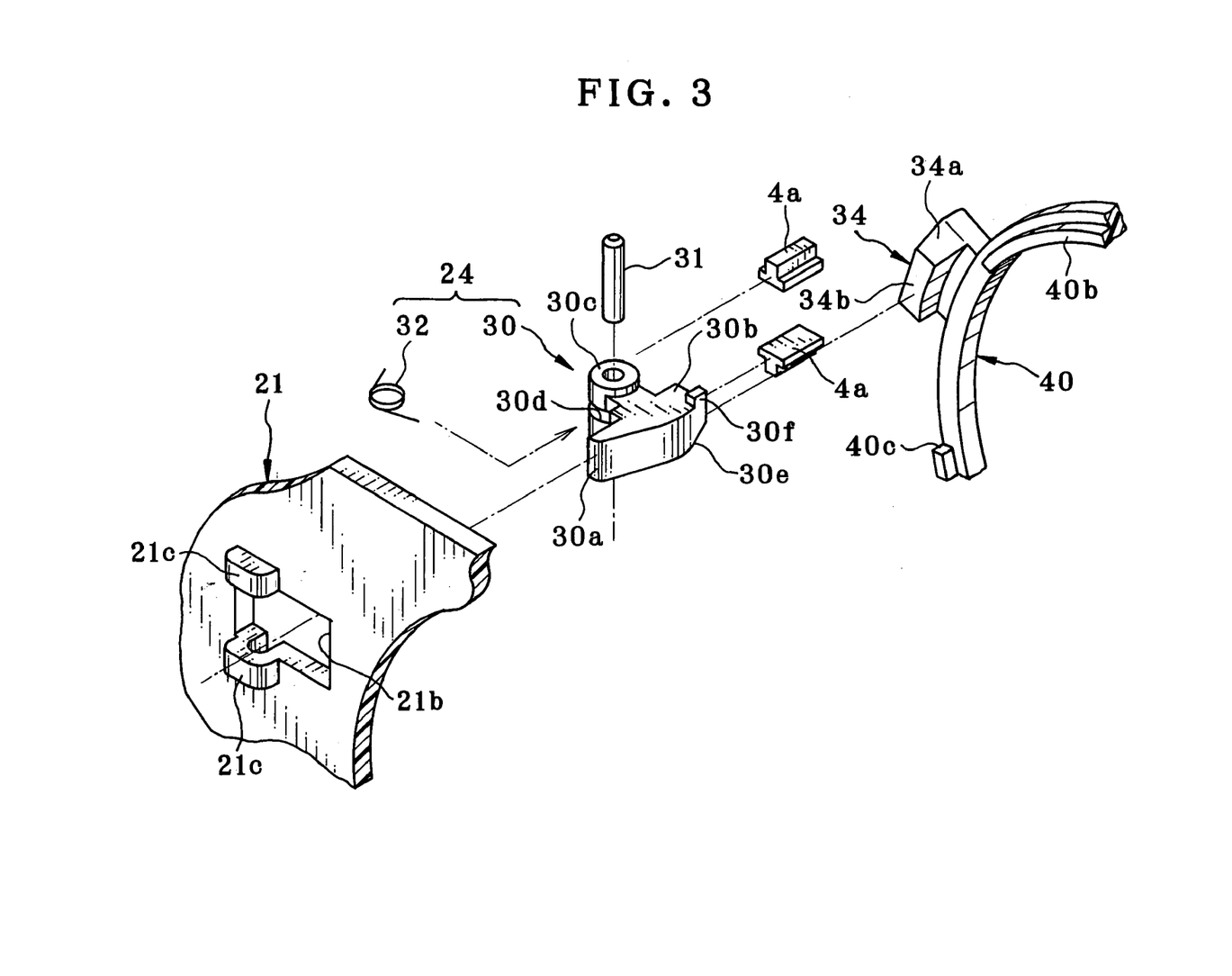
FIG. 3 is an exploded perspective illustrating a cover stopper.
Figure 4A:
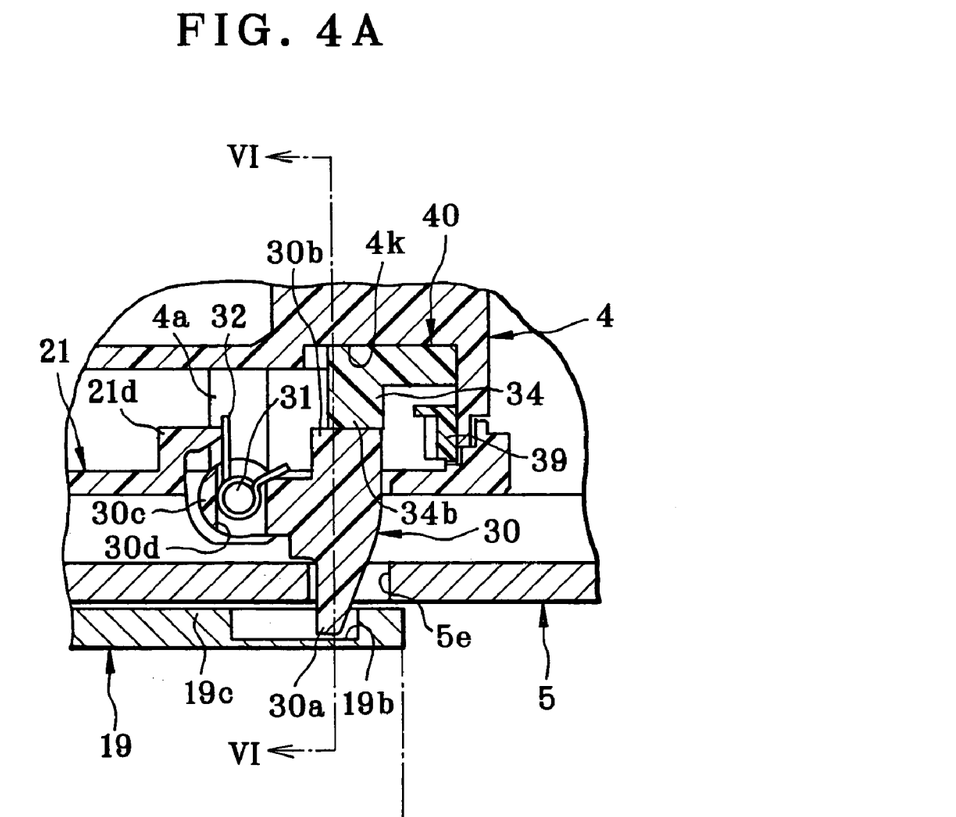
FIG. 4A is a section illustrating elements near to the cover stopper with the slidable cover in the open position.

In FIG. 3, the connection changer 24 is illustrated. In FIG. 4A, the state of the same is illustrated in a section for the slidable cover 19 in the open position. The connection changer 24 includes a cover stopper 30, a rotational shaft 31 and a stopper biasing spring 32 that is a torsion coil spring. The cover stopper 30 is formed from a plastic material. The shaft 31 is an element of metal. A stopper front end 30a of the cover stopper 30 has a decreasing size in a direction toward the front of the camera. A stopper rear end of the cover stopper 30 has a flat rear locking face 30b that is parallel to a front surface of the camera. Thus, the entirety of the cover stopper 30 is in a wedge shape. One surface of the cover stopper 30 is erect, where a cylindrical sleeve portion 30c for insertion is formed with the cover stopper 30, and receives insertion of the shaft 31. A cutout 30d is formed in the middle of the sleeve portion 30c, and receives insertion of the stopper biasing spring 32. The insertion of the shaft 31 exactly positions the stopper biasing spring 32 in the sleeve portion 30c.

The inner cover panel 21 includes an opening 21b, bearing portions 21c and a support portion 21d. The opening 21b receives insertion of the stopper front end 30a of the cover stopper 30. The bearing portions 21c receive both ends of the shaft 31 protruding from end faces of the sleeve portion 30c. The support portion 21d in FIGS. 4A and 5 supports the rear of the sleeve portion 30c for keeping the cover stopper 30 on the inner cover panel 21 without a drop. A pair of support projections 4a are formed with a front of the camera body 4, for supporting both ends of the shaft 31 from behind the same.

Figure 5:
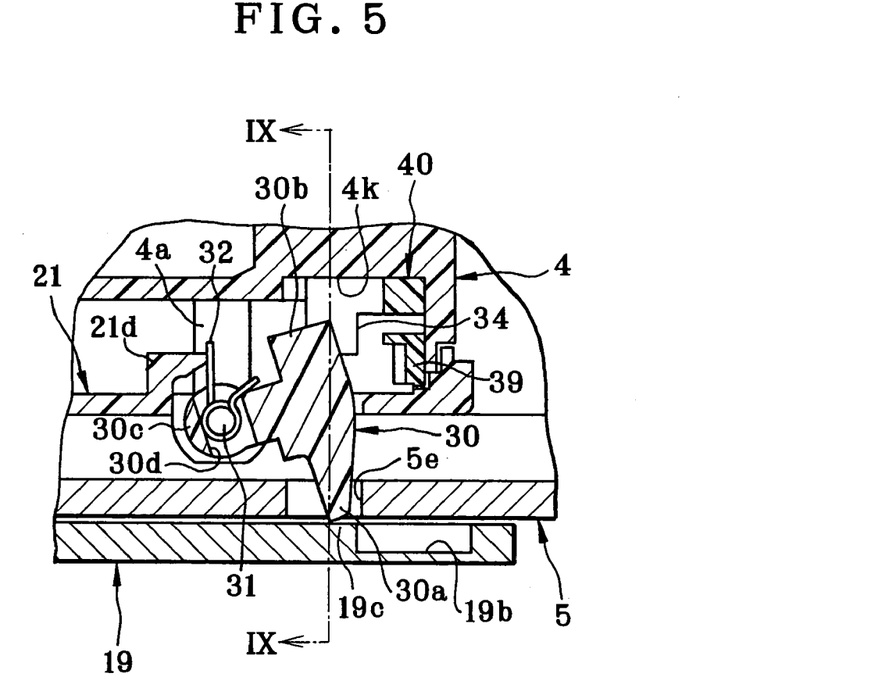
FIG. 5 is a section illustrating elements around the cover stopper in sliding of the slidable cover to the closed position.

An opening 5e is formed in the front cover 5. The stopper front end 30a of the cover stopper 30 is inserted in the opening 5e, and contacts a rear face of the slidable cover 19. A locking recess 19b is formed in the rear of the slidable cover 19, and opposed to the cover stopper 30 when the slidable cover 19 is in the open position, to receive insertion of the stopper front end 30a. In FIG. 5, the cover stopper 30 is rotationally shiftable between a stopping position and a releasing position, and when in the stopping position, causes the stopper front end 30a to protrude over the front of the front cover 5, and when in the releasing position, keeps the stopper front end 30a inside the front cover 5. The stopper biasing spring 32 biases the cover stopper 30 toward the stopping position.

Figure 6:
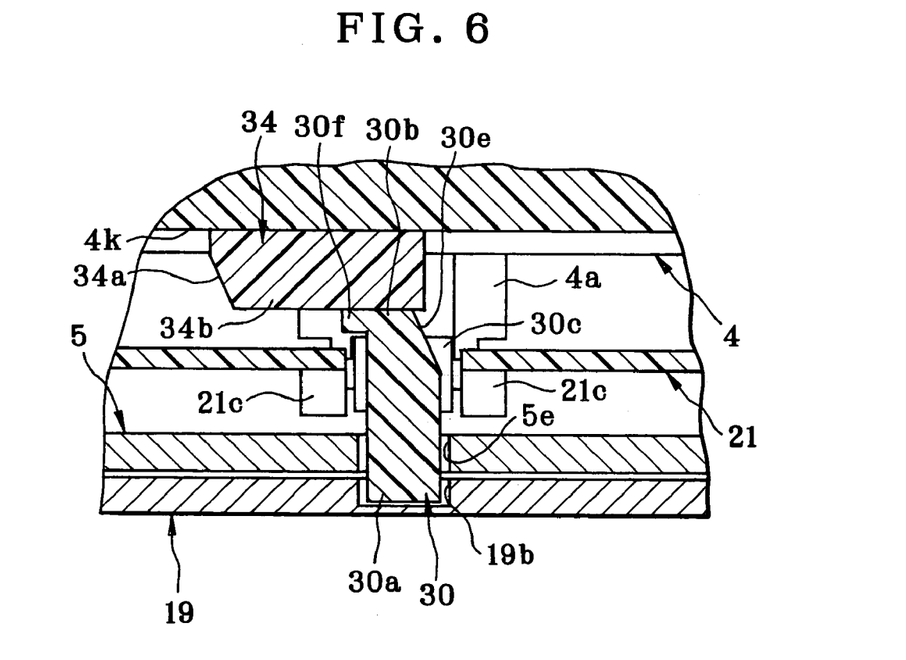
FIG. 6 is a section taken on line VI—VI in FIG. 4A.
Figure 7A:
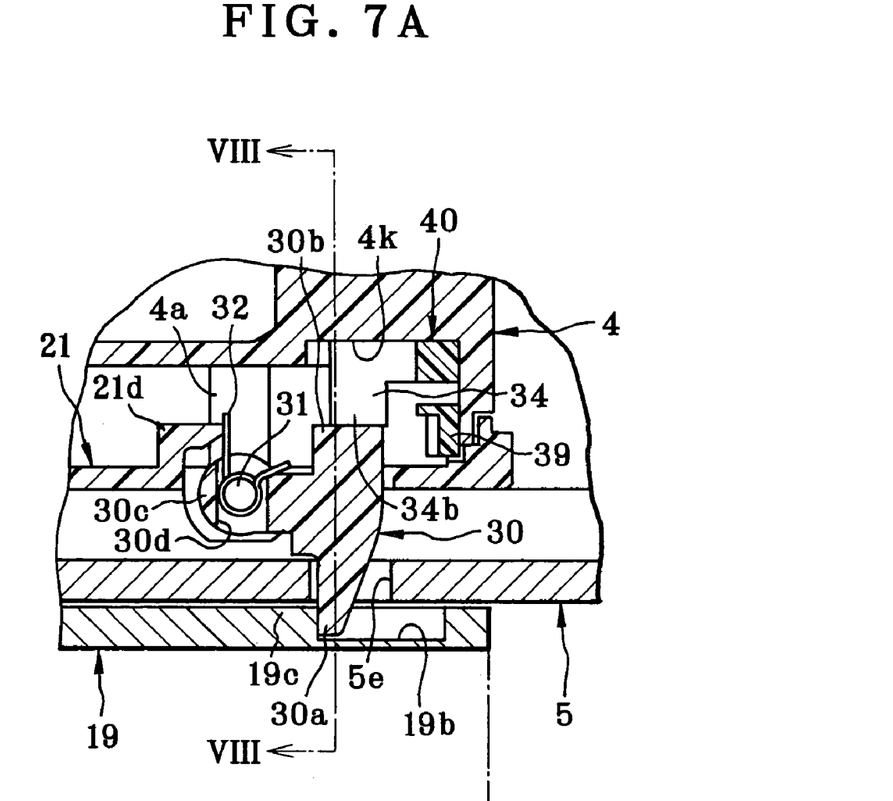
FIG. 7A is a section illustrating the element around the cover stopper in locking the slidable cover.
Figure 8:
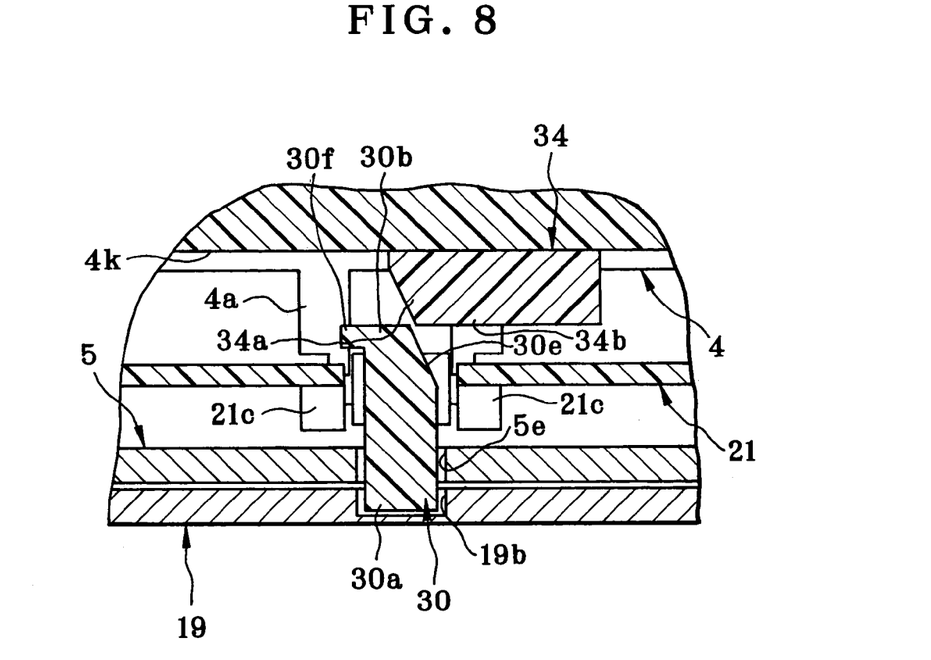
FIG. 8 is a section taken on line VIII—VIII in FIG. 7A.

A locking projection 34 as locking mechanism protrudes from a transmission ring 40, is disposed behind the cover stopper 30, and is movable into and out of a space between the camera body 4 and the rear locking face 30b of the cover stopper 30. FIG. 6 is a section taken on line VI—VI in FIG. 4A. While the movable lens barrel 9 is set in a certain photographing position between the wide-angle and telephoto end positions, a front locking face 34b of the locking projection 34 contacts the rear locking face 30b to block rotation of the cover stopper 30 toward the releasing position. In FIG. 7A, if force for sliding is applied to the slidable cover 19 toward the closed position with the movable lens barrel 9 set in one photographing position, the stopper front end 30a of the cover stopper 30 is engaged with the locking recess 19b, and prevents the slidable cover 19 from sliding further than this state. FIG. 8 is a section taken on line VIII—VIII in FIG. 7A. When the movable lens barrel 9 is collapsed entirely, the locking projection 34 moves away from behind the cover stopper 30, and allows the cover stopper 30 to rotate toward the releasing position.

Figure 9:
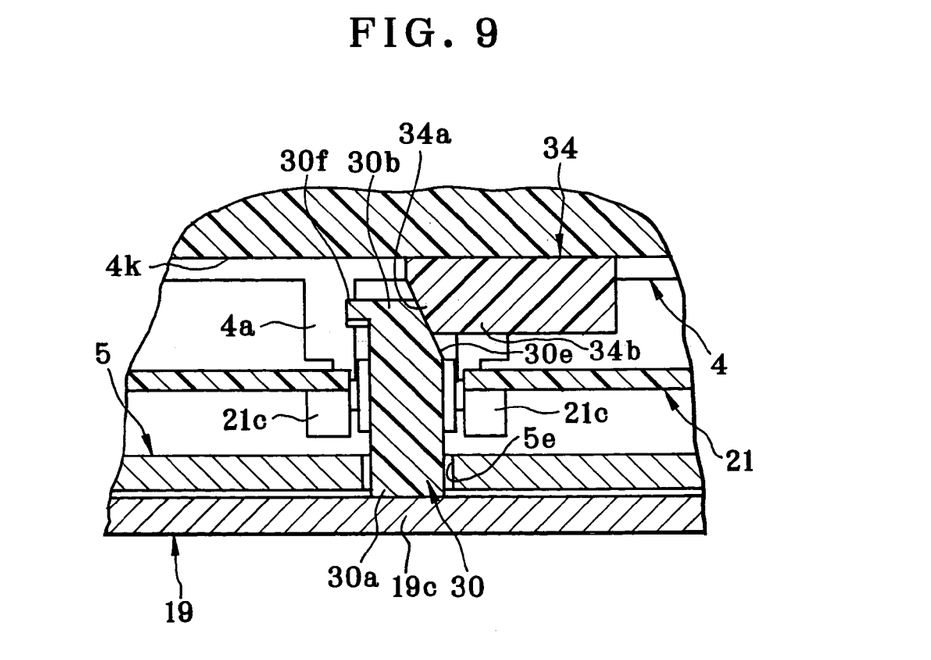
FIG. 9 is a section taken on line IX—IX in FIG. 5.

A first inclined face 34a is provided on the locking projection 34. A second inclined face 30e is provided on the cover stopper 30. FIG. 9 is a section taken on line IX—IX in FIG. 5. When the cover stopper 30 is rotated to the releasing position, the second inclined face 30e pushes the first inclined face 34a of the locking projection 34, to move the locking projection 34 in the forward direction as viewed from the cover stopper 30. A projection 30f of the cover stopper 30 is effective in stabilizing the contact between the cover stopper 30 and the locking projection 34 without enlarging the size of the cover stopper 30.

Figure 10:
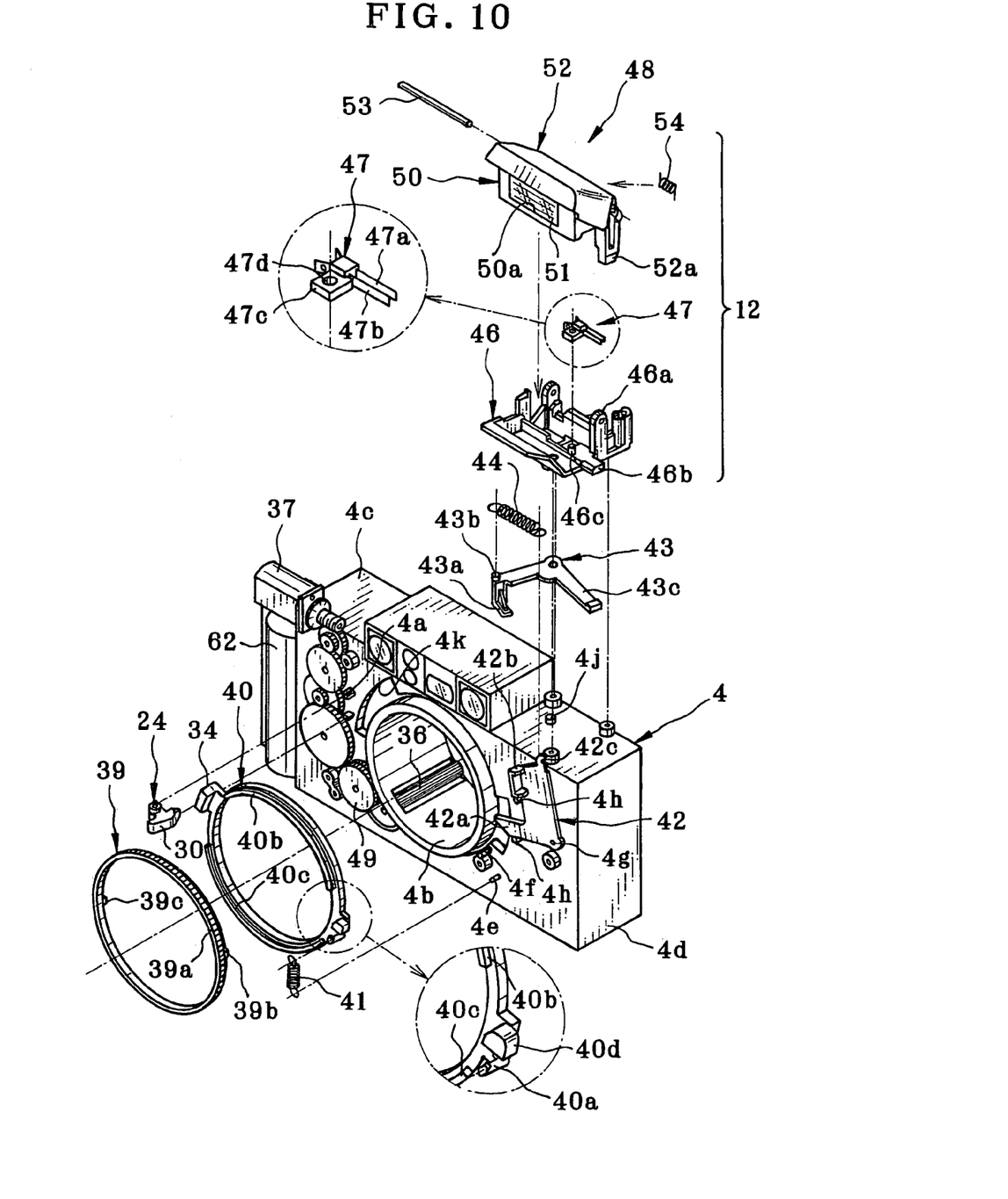
FIG. 10 is an exploded perspective illustrating portions of elements to be secured on the camera body.

In FIG. 10, a state of the camera body 4 from which the inner cover panel 21 is removed is illustrated. The camera body 4 includes a stationary barrel 4b, a cassette loading chamber 4c for a photo film cassette, and a roll chamber 4d for the photo film. The stationary barrel 4b supports the movable lens barrel 9 in a movable manner. The cassette loading chamber 4c and the roll chamber 4d are so disposed that the stationary barrel 4b lies between those. A long-size lens driving gear 36 in a transmission gear mechanism is contained in the stationary barrel 4b, for moving the movable lens barrel 9 between the collapsed position and photographing positions. A motor 37 as driving source is secured to an upper corner of the camera body 4. A set of plural gears are connected with the motor 37, disposed beside the stationary barrel 4b, and transmits rotation of the motor 37 to the lens driving gear 36 for moving the movable lens barrel 9.

To transmit rotation of the motor 37 to the flash emitting unit, elements for the transmission include a ring-shaped gear 39, a transmission ring 40, an auxiliary biasing spring 41 as tension coil spring, a first shift lever 42, a second shift lever 43 and a first biasing spring 44 which is a tension coil spring. The transmission ring 40 and the ring-shaped gear 39 have such an inner diameter that those are mounted to the periphery of the stationary barrel 4b one after another, and rotatable thereabout. A ring-shaped recess 4k is formed in the camera body 4 about the stationary barrel 4b for receiving the transmission ring 40 in relation to the optical axis direction.

In the ring-shaped gear 39, a tooth train 39a is located thereabout. A transmission gear 49 in the transmission gear mechanism is meshed with the tooth train 39a. When the motor 37 rotates, the ring-shaped gear 39 rotates together for moving the movable lens barrel 9 in the forward or backward direction. A first pressing projection 39b and a second pressing projection 39c project from a rear face of the ring-shaped gear 39. As viewed in a direction along an arc of the circular shape, the second pressing projection 39c is rotationally symmetrical with the first pressing projection 39b. However, the position of the second pressing projection 39c is determined at a greater radius than that of the position of the first pressing projection 39b.

Figure 11:
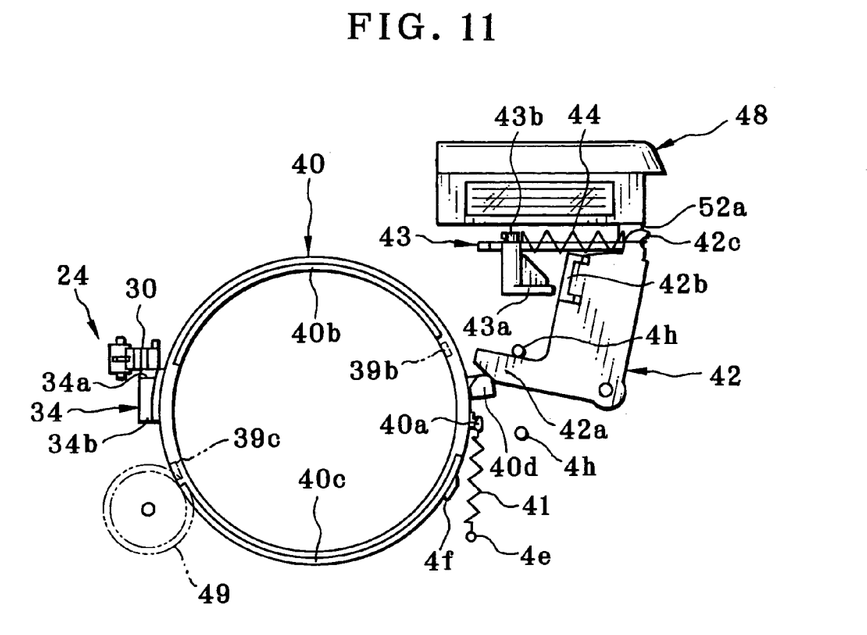
FIG. 11 is a front elevation illustrating elements in a state of the closed position, including a ring-shaped gear and a flip-up flash emitting unit.
Figure 12:
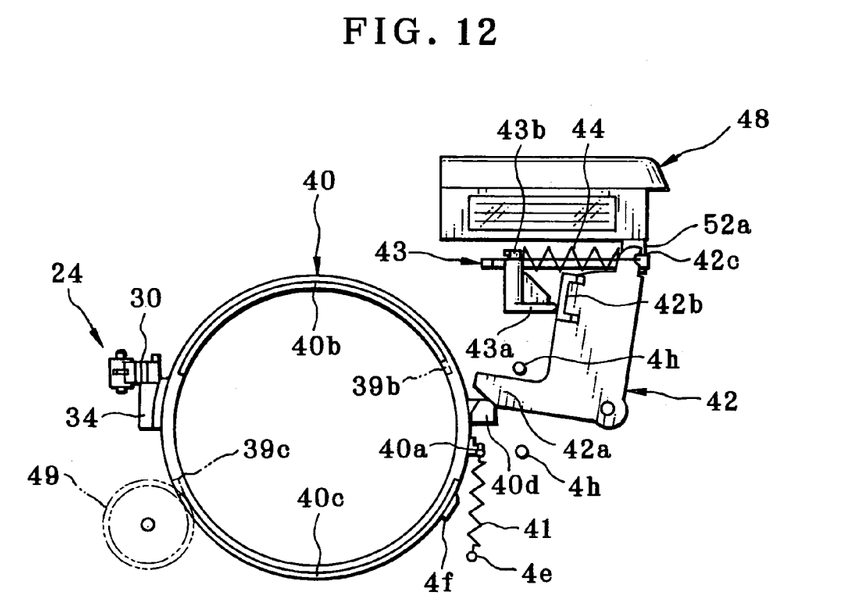
FIG. 12 is a front elevation illustrating the elements in a state immediately after opening the slidable cover.
Figure 13:
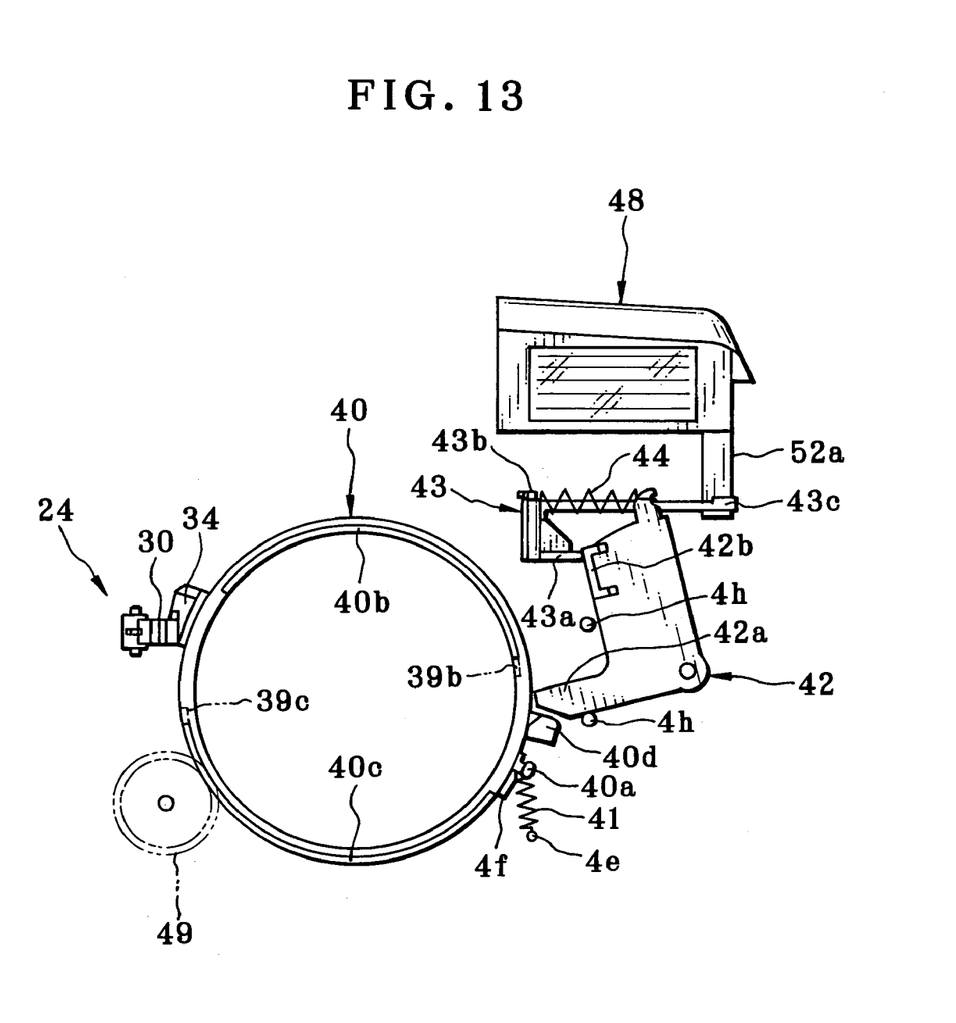
FIG. 13 is a front elevation illustrating the elements in a state of the open position.

In FIGS. 11–13, a first engaging ridge 40b as a first engaging portion is formed on a front face of the transmission ring 40 for contact with the first pressing projection 39b of the ring-shaped gear 39. A second engaging ridge 40c as a second engaging portion is formed on the transmission ring 40 for contact with the second pressing projection 39c, and rotationally symmetrical with the first engaging ridge 40b. The first and second engaging ridges 40b and 40c are projections, but the position of the second engaging ridge 40c is determined at a greater radius than that of the position of the first engaging ridge 40b, in association with the difference in the radius between the first and second pressing projections 39b and 39c.

The periphery of the transmission ring 40 is provided with a retention pin 40a, a contact projection 40d and the locking projection 34 described heretofore. The retention pin 40a retains a spring end of the auxiliary biasing spring 41. The contact projection 40d contacts the first shift lever 42. A pin 4e protrudes from the front of the camera body 4, and retains a second spring end of the auxiliary biasing spring 41, which biases the transmission ring 40 in the clockwise direction. A regulating projection 4f is formed with the front of the camera body 4, contacts the retention pin 40a, and regulates a rotating range of the transmission ring 40 in relation to the clockwise direction.

The first shift lever 42 has approximately an L-shape. A pin 4g protrudes from the front of the camera body 4, and supports the first shift lever 42 in a rotatable manner. The first shift lever 42 includes a linking lever end arm 42a, a contacting lever end portion 42b and a retention pin 42c. The lever end arm 42a contacts the contact projection 40d of the transmission ring 40. The lever end portion 42b contacts the second shift lever 43. The retention pin 42c retains one spring end of the first biasing spring 44. Regulating pins 4h protrude from the front of the camera body 4, contact the lever end arm 42a, and regulate a rotating amount of the first shift lever 42.

The second shift lever 43 has an L-shape. A pivotal pin 4j on an upper face of the camera body 4 supports the second shift lever 43 in a rotatable manner. The second shift lever 43 includes a contact or engaging end arm 43a, a retention pin 43b and a flash flip-up engaging end arm 43c. The engaging end arm 43a is located in front of the camera body 4, and contacts the lever end portion 42b of the first shift lever 42. The retention pin 43b retains a second spring end of the first biasing spring 44. The engaging end arm 43c causes the flash emitting unit to rotate between the contained position and the flashing position.

The first biasing spring 44 biases the first shift lever 42 in the counterclockwise direction, and biases the second shift lever 43 in the clockwise direction. A flash shifter is constituted by the ring-shaped gear 39, the transmission ring 40 and the first and second shift levers 42 and 43. When no load is applied to the first and second shift levers 42 and 43, then the first shift lever 42 makes a counterclockwise rotation, the second shift lever 43 making a clockwise rotation. So the lever end portion 42b contacts the engaging end arm 43a.

The flip-up flash device 12 includes a flash support panel 46, a detection switch 47 and a flash emitting unit 48. The flash support panel 46 is firmly secured to the camera body 4 and positioned to keep the second shift lever 43 rotatable without interference. The detection switch 47 is secured to the flash support panel 46. The flash emitting unit 48 is supported on the flash support panel 46 in a rotatable manner. The flash support panel 46 includes a couple of bearing portions 46a as rotational support mechanism, and a stopper pin 46b. The bearing portions 46a keep the flash emitting unit 48 rotatable. The stopper pin 46b prevents the flash emitting unit 48 from moving beyond the flashing position.

The detection switch 47 is constituted by elements including contact segments 47a and 47b of metal, and a contact segment holder 47c of a plastic material. A flash circuit 62 of FIG. 2 which includes a main capacitor, is connected with the contact segments 47a and 47b. The contact segment holder 47c holds the contact segments 47a and 47b in a state kept from contacting each other. A hole 47d is formed in the contact segment holder 47c. A pin 46c protrudes over an upper face of the flash support panel 46, is inserted in the hole 47d to keep the detection switch 47 fastened. When the contact segments 47a and 47b in the detection switch 47 are contacted by one another, the detection switch 47 is closed to enable the flash circuit 62 to emit flash light from the flash emitting unit 48.

The flash emitting unit 48 includes a light source holder 50, a cover panel 52, a rotational shaft 53 of metal as rotational support mechanism, and a flash biasing spring 54 as torsion coil spring of metal. The light source holder 50 has a front opening 50a and a diffusing lens 51 or Fresnel lens. The front opening 50a is in a front portion of the light source holder 50. A flash discharge tube and a reflector are contained in the light source holder 50 behind the front opening 50a. The diffusing lens 51 is fitted in the front opening 50a of the light source holder 50 to constitute the flashing surface 13. The cover panel 52 is secured to an upper side of the light source holder 50, and comes to constitute an extension of the front cover 5 when the flash emitting unit 48 is set in the contained position rotationally. The shaft 53 is inserted in the bearing portions 46a of the flash support panel 46 and in a through hole of the cover panel 52, and sets the flash emitting unit 48 on the flash support panel 46 in a rotatable manner. The flash biasing spring 54 is contained between the cover panel 52 and the light source holder 50, and biases the flash emitting unit 48 toward the flashing position.

Figure 14:
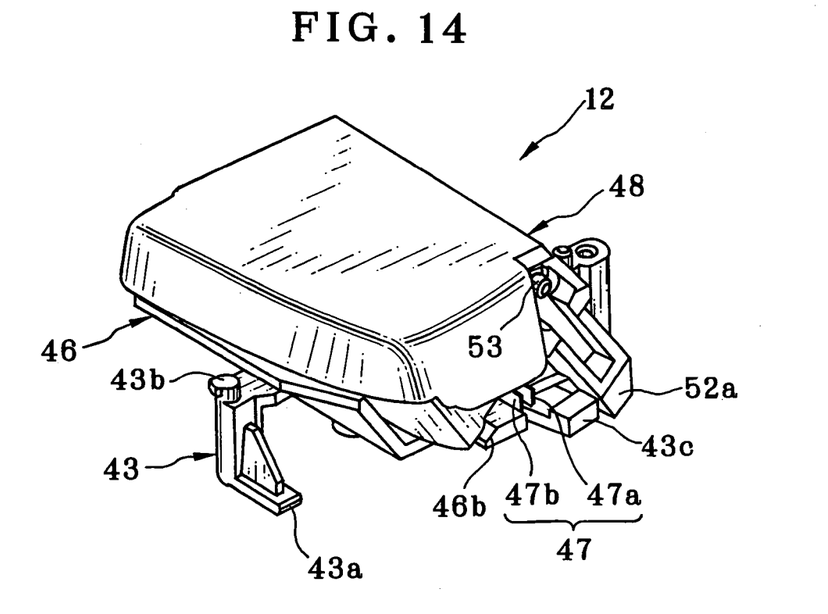
FIG. 14 is a perspective illustrating the flash emitting unit set in a contained position.
Figure 15:
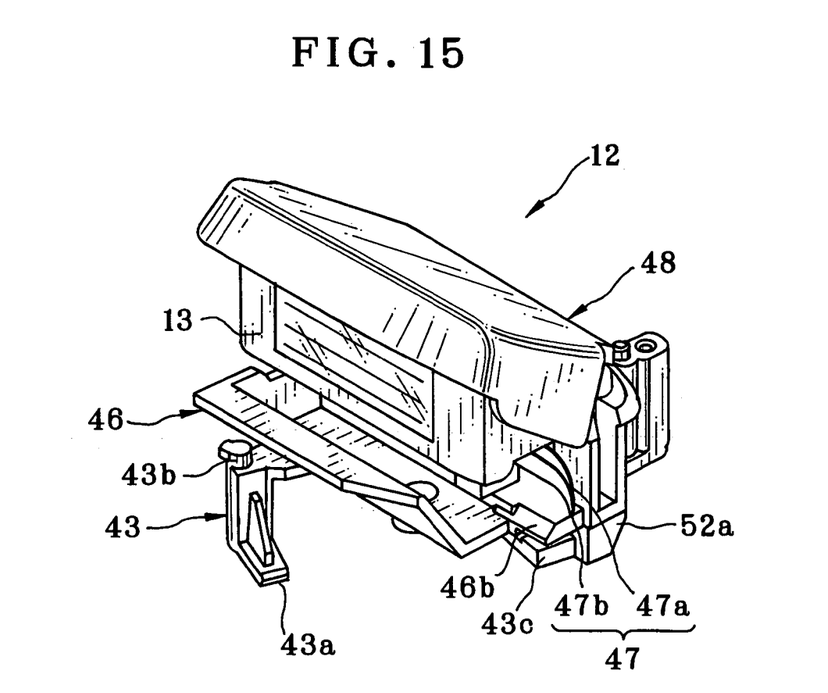
FIG. 15 is a perspective illustrating the flash emitting unit set in a flashing position.

In FIGS. 14 and 15, a lever projection 52a protrudes from the cover panel 52, to contact the engaging end arm 43c of the second shift lever 43. When the flash emitting unit 48 is rotationally shifted to the flashing position, the lever projection 52a contacts the stopper pin 46b of the flash support panel 46, to retain the flash emitting unit 48 in the flashing position. Also, when the flash emitting unit 48 is in the flashing position, the lever projection 52a presses the contact segment 47a of the detection switch 47, and causes the same to contact the contact segment 47b.

Figure 7B:
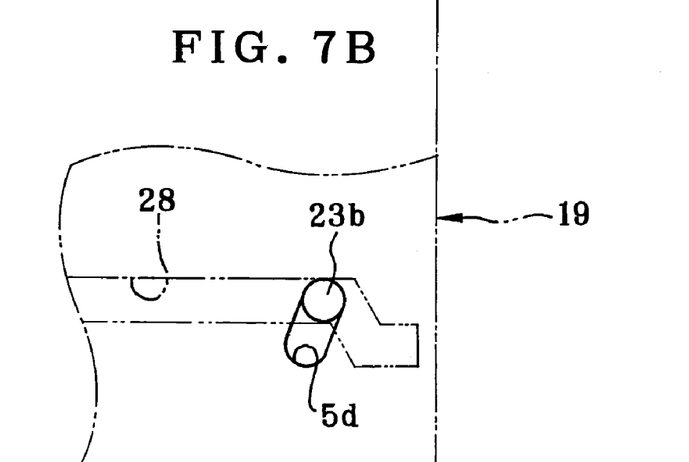
FIG. 7B is an explanatory view in plan, illustrating another state of the linking pin positioned at a point in the linking groove.

The operation of the above embodiment is described now. In FIG. 1A, the slidable cover 19 is set in the closed position when the camera 2 is not used. The slidable cover 19 is covering the movable lens barrel 9. In FIGS. 2 and 7B, the linking pin 23b of the switch lever 23 is positioned in the horizontal portion of the linking groove 28 of the slidable cover 19. The power switch 22 is kept turned off by the linking pin 23b.

In FIGS. 5 and 9, the cover stopper 30 is rotationally set in the releasing position because depressed by a rear pressing portion 19c of the slidable cover 19 while the power is turned off. The second inclined face 30e presses the first inclined face 34a of the locking projection 34, to set the transmission ring 40 rotationally in the counterclockwise direction in FIG. 11. In FIG. 11, the contact projection 40d of the transmission ring 40 pushes the lever end arm 42a, and rotationally sets the first shift lever 42 in the clockwise direction.

The first shift lever 42 causes the first biasing spring 44 to pull the second shift lever 43. In FIG. 10, the second shift lever 43 is rotated in the counterclockwise direction. In FIG. 14, the engaging end arm 43c of the second shift lever 43 presses the lever projection 52a in the counterclockwise direction, to set the flash emitting unit 48 rotationally in the contained position.

While the power is turned off, the first shift lever 42 is positioned farther from the second shift lever 43 to overcharge the first biasing spring 44. Thus, the flash emitting unit 48 can be kept in the contained position reliably. As the cover stopper 30 rotates the transmission ring 40, the first and second pressing projections 39b and 39c come away from respectively the first and second engaging ridges 40b and 40c. The ring-shaped gear 39 is unlinked from the transmission ring 40. Thus, the gears can be free from application of load with time even in connection with the auxiliary biasing spring 41 or the first biasing spring 44, or the flash biasing spring 54. The teeth of the gear can be protected from unwanted deformation with creep.

Figure 4B:
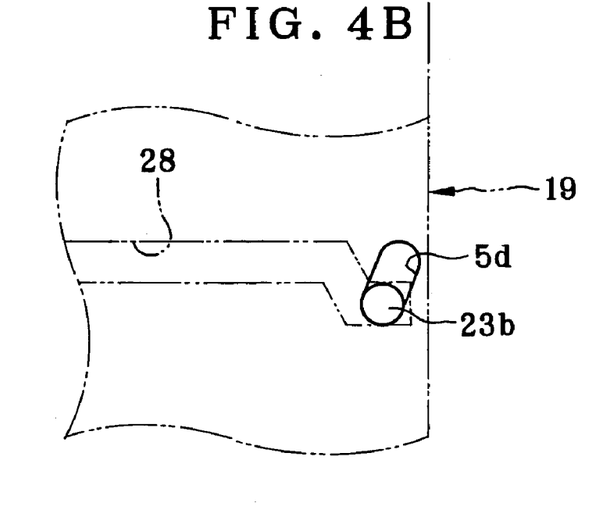
FIG. 4B is an explanatory view in plan, illustrating a state of a linking pin positioned at a point in a linking groove.

In FIG. 1B, the slidable cover 19 is slid to the open position. In FIG. 4B, the linking pin 23b is shifted to the end bent portion of the linking groove 28. The switch lever 23 makes a clockwise rotation in FIG. 2. It follows that the switching arm 23a depresses the pushbutton element 22b of the power switch 22, to turn on the power of the camera. In FIG. 4A, the cover stopper 30 is rotated by the stopper biasing spring 32 to the locked position, to insert the stopper front end 30a into the locking recess 19b of the slidable cover 19.

When the cover stopper 30 rotationally moves to the stopping position, the transmission ring 40 is caused by the auxiliary biasing spring 41 to rotate in the clockwise direction in FIG. 12. The first and second engaging ridges 40b and 40c are caused to contact the first and second pressing projections 39b and 39c of the ring-shaped gear 39.

When the power source for the camera 2 is turned on, the motor 37 rotates in the direction to move the movable lens barrel 9 forwards. Rotation of the motor 37 is transmitted to the lens driving gear 36 by the transmission gear mechanism having plural gears, to move the movable lens barrel 9 forwards with respect to the camera 2. Also, the rotation of the motor 37 is transmitted by the transmission gear 49 to the ring-shaped gear 39, which rotates in the clockwise direction. In response to the clockwise rotation of the ring-shaped gear 39, the first and second engaging ridges 40b and 40c are released from depression with the first and second pressing projections 39b and 39c. The transmission ring 40, biased by the auxiliary biasing spring 41, rotates further in the clockwise direction.

In FIG. 13, the retention pin 40a rotates to a position for contacting the regulating projection 4f. In FIGS. 4A and 6, the locking projection 34 moves to the position between the camera body 4 and the cover stopper 30, to block rotation of the cover stopper 30 directed toward the releasing position. Thus, the slidable cover 19 is locked in the open position.

The first shift lever 42 is released from the depression with the contact projection 40d of the transmission ring 40. Thus, the first shift lever 42 is caused to make a counterclockwise rotation by the first biasing spring 44, which causes the second shift lever 43 to make a clockwise rotation. The lever projection 52a is released from the depression with the engaging end arm 43c. In FIG. 15, the flash biasing spring 54 causes the flash emitting unit 48 to rotate toward the flashing position. The lever projection 52a comes in contact with the stopper pin 46b of the flash support panel 46, firmly to set the flash emitting unit 48 in the flashing position.

The lever projection 52a of the flash emitting unit 48 rotationally set in the flashing position depresses the contact segment 47a of the detection switch 47, and causes the same to contact the contact segment 47b. Thus, a signal to enable the flash circuit 62 is output by the contact segment 47b. The setting of the flash emitting unit 48 in the flashing position is detected.

As described heretofore, the lever projection 52a in a single form is multi-functional, because of linking the flash emitting unit 48 with the second shift lever 43, setting the flash emitting unit 48 in the flashing position, and turning on and off of the detection switch 47. It is possible to prevent the unwanted enlargement of the flash emitting unit, and to determine points of the operation of the lever projection 52a with a sufficient distance from the rotational center of the flash emitting unit 48. Also in view of this, it is possible with the lever projection 52a to keep the precision high in the operation.

The lever projection 52a is kept unlinked from the second shift lever 43. If external force is applied to the flash emitting unit 48 incidentally toward the contained position, or if the switch for turning on the power is operated with force to the flash emitting unit 48 toward the contained position, there will occur no damages in the camera 2. If the flash emitting unit 48 is forcibly rotated toward the flashing position in the turned-off state of the power, the camera 2 can be still protected from being damaged, because rotation of the second shift lever 43 is absorbed by the first biasing spring 44, and prevented from transmission to the first shift lever 42.

The ring-shaped gear 39 rotates also when the movable lens barrel 9 moves from the wide-angle end position to the telephoto end position. A ratio of the speed reduction of the gears is considerably great because of the great diameter of the ring-shaped gear 39. This is effective in keeping small a rotating amount of the ring-shaped gear 39. There is no incidental abutment of the first and second pressing projections 39b and 39c on opposite faces of the first and second engaging ridges 40b and 40c. The radius of the position of the first pressing projection 39b and the first engaging ridge 40b is different from the radius of the second pressing projection 39c and the second engaging ridge 40c. The transmission of force between the ring-shaped gear 39 and the transmission ring 40 according to couple of the force can be safe without abutment between the first pressing projection 39b and the second engaging ridge 40c.

After exposures are taken, the slidable cover 19 is slid to the closed position. The stopper front end 30a of the cover stopper 30 becomes engaged with the locking recess 19b. See FIG. 7A. The slidable cover 19 is kept from sliding. In FIG. 7B, the slidable cover 19 is being locked by the cover stopper 30. The linking pin 23b of the switch lever 23 is set in the horizontal portion of the linking groove 28. The power of the camera 2 is turned off while the slidable cover 19 is locked in the state without interference with the movable lens barrel 9. The movable lens barrel 9 is moved backwards for the collapse.

Most of the force applied in a direction to slide the slidable cover 19 toward the closed position is applied to the stopper front end 30a of the cover stopper 30. The cover stopper 30 can be free from breakage, because the stopper front end 30a has a sufficient thickness, and has a wedge shape with a substantially small length. The force to the cover stopper 30 is also transmitted to the locking projection 34 of the transmission ring 40. However, the transmission ring 40 does not break, because the force to the locking projection 34 is received behind by the ring-shaped recess 4k of the camera body 4. Furthermore, the rear locking face 30b of the cover stopper 30 and the front locking face 34b of the locking projection 34 are flat or very smooth. Rotation of the transmission ring 40 is prevented from being blocked even when the cover stopper 30 is pressed against the locking projection 34.

Rotation of the motor 37 is transmitted to the lens driving gear 36 by plural gears in the transmission gear mechanism, to collapse the movable lens barrel 9. The ring-shaped gear 39 is rotated by the transmission gear 49 in the counterclockwise direction. The transmission ring 40 rotates in the same direction as the first and second pressing projections 39b and 39c push the first and second engaging ridges 40b and 40c. The contact projection 40d pushes the lever end arm 42a of the first shift lever 42, which is rotated in the clockwise direction. The first shift lever 42 causes the first biasing spring 44 to rotate the second shift lever 43 in the counterclockwise direction. The engaging end arm 43c pushes the lever projection 52a of the flash emitting unit 48. In FIG. 14, the flash emitting unit 48 rotationally shifts to the contained position.

To contain the flash emitting unit 48, high force is required because of a direction of the force against the bias of the auxiliary biasing spring 41, the first biasing spring 44 and the flash biasing spring 54. However, the ratio of the speed reduction can be very great owing to the ring-shaped gear 39. It is possible to rotate the flash emitting unit 48 smoothly and lightly. The ring-shaped gear 39 and the transmission ring 40 rotate only at a small amount in the course of moving of the movable lens barrel 9 between the collapsed position and the wide-angle end position. However, a great stroke on the outer periphery can be obtained by means of the considerably great diameter of the ring-shaped gear 39 and the transmission ring 40. The flash emitting unit 48 can be linked with high reliability.

For transmission between the transmission ring 40 and the flip-up flash device 12, the first and second shift levers 42 and 43 are used and disposed on the upper and front panels of the camera 2. This is effective in economizing the space for containing, and reducing the size of the entirety of the camera 2. Furthermore, the first biasing spring 44 with a low cost is used for connection between the first and second shift levers 42 and 43. It is possible to contain a tension coil spring as the first biasing spring 44 in a considerably small space in comparison with a space which would contain a toggle spring or the like. A manufacturing cost can be reduced remarkably.

The motor 37 stops rotating upon the completion of collapsing of the movable lens barrel 9 and the containing of the flash emitting unit 48. In FIG. 8, the locking projection 34 moves away from the rear of the cover stopper 30. The slidable cover 19 is released from blocking of the cover stopper 30. When the slidable cover 19 is slid to the closed position, the cover stopper 30 is pushed by the rear pressing portion 19c of the slidable cover 19, and rotates to the releasing position. In FIG. 9, the second inclined face 30e pushes the first inclined face 34a of the locking projection 34. In FIG. 11, the transmission ring 40 is caused to make a counterclockwise rotation. Therefore, the load of the auxiliary biasing spring 41, the first biasing spring 44 and the flash biasing spring 54 becomes applied to the cover stopper 30 in place of the ring-shaped gear 39.

In the above embodiment, the ring-shaped gear 39 is disposed in front of the transmission ring 40. However, the ring-shaped gear 39 may be disposed behind the transmission ring 40.

Note that, in the above embodiment, the transmitting connection of elements included in the flash shifter is discontinued, namely the ring-shaped gear is disengaged from the transmission ring. However, the feature of the invention can be also used in discontinuing the transmitting connection of an additional gear disposed between the transmission gear mechanism and the ring-shaped gear. The additional gear can be shifted for the purpose of discontinuing and maintaining the transmitting connection between the transmission gear mechanism and the ring-shaped gear.

In the above embodiment, the flash built-in camera of the invention is a photographic camera for use with silver halide photographic film. Furthermore, a camera of the invention can be a digital still camera, a digital video camera, or other optical instrument provided with a flip-up flash device.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A camera comprising:
    a movable lens barrel movable between a collapsed position and at least one photographing position, contained in a camera body when in said collapsed position, set more forward when in said at least one photographing position than when in said collapsed position, for holding a taking lens;
    a flash emitting unit movable between a contained position and a flashing position, contained in said camera body when in said contained position, disposed to protrude from said camera body when in said flashing position, and enabled to emit flash light to a photographic field;
    a first biasing mechanism for biasing said flash emitting unit toward said contained position;
    a slidable cover movable between a closed position and an open position, for covering a front of said movable lens barrel when in said closed position, and for uncovering said front of said movable lens barrel when in said open position;
    a motor disposed in said camera body;
    a transmission gear mechanism for transmitting motion from said motor to said movable lens barrel;
    a flash shifter for moving said flash emitting unit between said contained position and said flashing position according to said motion derived from said transmission gear mechanism; and
    a connection changer set in a first set position when said slidable cover is in said closed position, and set in a second set position when said slidable cover is in said open position, for discontinuing a transmitting connection in elements from said transmission gear mechanism to said flash emitting unit when in said first set position, to prevent transmission of force of said first biasing mechanism to said transmission gear mechanism, and for maintaining said transmitting connection when in said second set position.

2. A camera as defined claim 1, wherein said connection changer discontinues said transmitting connection in said flash shifter.

3. A camera as defined claim 2, wherein said motor rotates forwards to move said movable lens barrel from said collapsed position to said photographing position, and rotates backwards to move said movable lens barrel from said photographing position to said collapsed position.

4. A camera as defined claim 3, wherein said flash shifter includes:
    a ring-shaped gear, disposed about said movable lens barrel in a rotatable manner, meshed with said transmission gear mechanism, for rotating in a first direction when said motor rotates forwards, and for rotating in a second direction when said motor rotates backwards;
    a transmission ring disposed about said movable lens barrel in a rotatable manner in said first and second directions;
    a transmission mechanism for rotating said transmission ring in response to rotation of said ring-shaped gear;
    a linking mechanism, responsive to rotation of said transmission ring, for moving said flash emitting unit to said flashing position with bias of said first biasing mechanism when said transmission ring rotates in said first direction, and for moving said flash emitting unit to said contained position with said first biasing mechanism when said transmission ring rotates in said second direction.

5. A camera as defined claim 4, wherein said transmission mechanism includes:
   at least one pressing projection formed with said ring-shaped gear;
   a second biasing mechanism for biasing said transmission ring rotationally in said first direction;
   at least one engaging projection formed with said transmission ring and adapted to contact said pressing projection, wherein when said ring-shaped gear rotates in said first direction, said second biasing mechanism causes said transmission ring to rotate in said first direction, and said engaging projection moves simultaneously with said pressing projection, and when said ring-shaped gear rotates in said second direction, said pressing projection causes said transmission ring to rotate in said second direction by pressing said engaging projection.

6. A camera as defined claim 5, wherein said slidable cover is moved back to said closed position after said motor is turned off, and responsively said connection changer causes said transmission ring further in said second direction, to set away said engaging projection from said pressing projection.

7. A camera as defined claim 6, wherein said connection changer includes:
   a cover stopper movable between a stopping position and a releasing position, for retaining said slidable cover in said open position when in said stopping position, and for moving back from said stopping position to said releasing position when said slidable cover moves from said open position to said closed position;
   a third biasing mechanism for biasing said cover stopper toward said stopping position;
   a projection formed to project from said transmission ring, having one lateral portion, wherein in moving back of said cover stopper from said stopping position to said releasing position, one portion of said cover stopper presses said lateral portion of said projection, for rotating said transmission ring in said second direction.

8. A camera as defined claim 7, wherein said lateral portion of said projection has an inclined face, and said one portion of said cover stopper has an include face for facilitating pressing of said one portion to said lateral portion.

9. A camera as defined claim 7, wherein when said movable lens barrel is set in said photographing position, a front portion of said projection is positioned behind said cover stopper, to block movement of said cover stopper from said stopping position to said releasing position, and when said movable lens barrel is set in said collapsed position, said projection moves to allow said cover stopper to move from said stopping position to said releasing position.

10. A camera as defined claim 9, wherein said slidable cover includes an engageable portion formed therewith, wherein when said slidable cover is set in said open position, said engageable portion is engaged with a distal end of said cover stopper being set by said third biasing mechanism to said stopping position.

11. A camera as defined claim 10, wherein said cover stopper is rotatable about an axis which extends perpendicularly to an axis about which said transmission ring is rotatable.

12. A camera as defined claim 10, wherein said linking mechanism further includes:
   a shaft for rotationally supporting said flash emitting unit movably between said contained position and said flashing position;
   a first shift lever for contacting one portion of said transmission ring, and for rotating in response to rotation of said transmission ring in said second direction;
   a second shift lever for being rotated in a third or fourth direction in response to rotation of said first shift lever;
   a biasing mechanism for connecting said first and second shift levers with one another for rotation thereof together, and for allowing said second shift lever to rotate in said third direction when said flash emitting unit moves from said contained position forcibly to said flashing position during a stop of said first shift lever; and
   an arm, formed on said flash emitting unit, for contacting said second shift lever, wherein when said second shift lever rotates in said third direction, said arm is caused by said first biasing mechanism to move said flash emitting unit toward said flashing position simultaneously with said second shift lever, and when said second shift lever rotates in said fourth direction, said arm is pressed by said second shift lever to move said flash emitting unit toward said contained position.

* * * * *